United States Patent Office 3,022,050
Patented Feb. 20, 1962

3,022,050
INTRODUCTION OF VAPORIFIC LIQUID TO A PRESSURE EXCHANGER
Dudley Brian Spalding, 2 Vineyard Hill Road, Wimbledon, London, England
Filed Oct. 24, 1956, Ser. No. 618,101
Claims priority, application Great Britain Oct. 25, 1955
4 Claims. (Cl. 257—267)

This invention relates to pressure exchangers and to means for increasing the output of pressure exchangers.

The output and pressure ratio obtainable with previously proposed pressure exchangers have been limited by the temperatures which may be permitted to develop in the cells, and in appropriate instances, by the temperature which can be accommodated by plant obtaining its useful gas supply from the cells. These temperature limits have inevitably limited the attainable thermal efficiency. It would be advantageous to increase both the output and the pressure ratio while keeping upper temperatures within tolerable limits.

The present invention provides means for increasing the output of a pressure exchanger that comprises the introduction of vaporific liquid into the working fluid of the pressure exchanger and at least partly vaporizing said liquid by heat input to said working fluid to produce high-pressure vapor.

It is of course known to inject water into a gas turbine plant. This has the effect of increasing the power output by decreasing compressor work but the pressure ratio is unaltered. Water injection has also been employed in internal-combustion piston engines to cool the combustion chamber walls and to enable a larger mass of air to be drawn in. This injection also increases the power output by increasing the volumetric efficiency. The compression ratio is however not increased because the cooling of the combustion gases is not completely compensated by the effect of the simultaneous formation of steam. The present invention can only be contrasted, not properly compared, with the previous practice of water injection into a different plant.

The vaporific liquid injection may be arranged directly into cells, in liquid droplet form into the inlet duct at the low-pressure scavenging stage, or into the high-pressure scavenging ducting. The vaporific liquid is preferably introduced into said high-pressure ducting downstream of said heat input to the pressure exchanger. A heat exchange may be effected between the vaporific liquid to be introduced and exhaust gases of the pressure exchanger. Some vapor scavenging may be employed in conjunction with the hot-gas scavenging so as to reduce the possibility of trapping hot-gases in the cells as they pass to subsequent stages of the cycle.

The present invention also provides a pressure exchanger comprising cells for the compression and expansion of working fluid, ducting to lead gas to and from the cells, means for effecting relative motion between the cells and the ducting, means for introducing vaporific liquid into the working fluid of the pressure exchanger and means for introducing heat to the contents of said cells at least partially to vaporize said liquid.

Said means for introducing vaporific liquid may be arranged to inject said liquid directly into the pressure exchanger cells, or in droplet form into an inlet duct at a low-pressure scavenging stage, or into high-pressure scavenging ducting. If the injection takes place into said high-pressure scavenging ducting it is preferable that it should take place into said ducting downstream of said means for introducing heat to the contents of the pressure exchanger cells.

The pressure exchanger cells may incorporate or be in the form of a heat-storing matrix. The matrix may comprise a number of tubes or may be in the form of a metal honeycomb. The heat storage capacity of the matrix may be different at opposite ends of each cell. If the cells themselves form the matrix, then they are preferably constructed with a large length/width ratio.

Where a heat-storing cell ring is employed means may be provided to introduce heat to the matrix by way of low-pressure hot gases derived from a furnace. Transfer passages may be used, if not primarily for pressure exchange purposes, for reducing wastage of high-pressure vapor.

It is envisaged that embodiments of the present invention may replace steam boilers in some applications. One advantage to be expected in such applications is that there would be no appreciable delay in "raising steam."

Embodiments of the invention will be described below, by way of example only, with reference to the accompanying drawings, in which.

Figure 1:
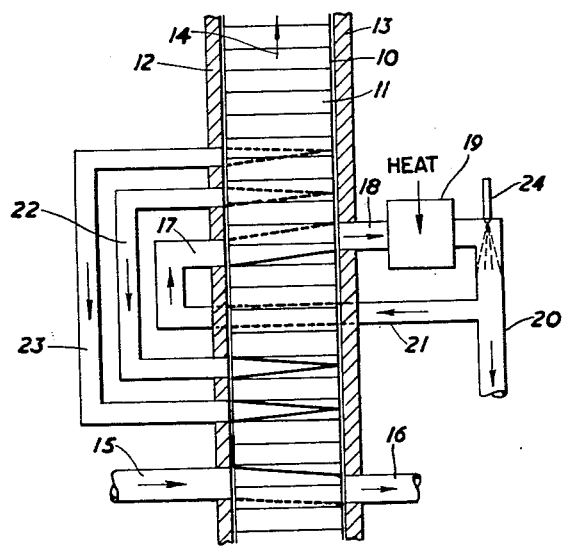
FIGURE 1 shows a diagrammatic peripheral development of a pressure exchanger having transfer passages and water injection in the heat input ducting external to the cells.

In FIGURE 1 there will be seen a pressure exchanger cell ring rotor 10 having cells 11. The cell ring is rotatable through drive means 36 and shaft 37 relatively to the end plates 12 and 13 and lies between the end plates. The direction of relative rotation is shown by an arrow 14. A low-pressure scavenging stage comprises ducts 15 and 16 and inlet and outlet branches of a high-pressure scavenging stage are shown at 17 and 18 respectively. The outlet branch 18 is connected to a heat input means 19, which may be a combustion chamber in which fuel is burnt, and that heat input means is connected via a duct 20 to apparatus making use of the hot high-pressure gas and via a duct 21 back to the inlet branch 17 of the high-pressure scavenging stage. Transfer passages 22 and 23 are provided. These arrangements are all conventional, the unconventional feature being a water spray nozzle 24 which the gas in the heat input ducting system meets immediately downstream of the heat input means 19. The water of course at least partially vaporizes in the hot gases so that fluid entering the cells through the inlet branch 17 at the high-pressure scavenging stage contains high-pressure steam. A proportion of the water serves to wet and hence cool the walls of the duct and cells. This enables the compression wave passing through the cells at this stage to be of large magnitude so that the pressure ratio of the pressure exchanger is increased. As the water has taken up the latent heat of vaporization from the hot-gases however, the temperatures remain at tolerable values. In the design of the pressure-exchanger efforts are made to ensure that the line of demarcation between the steam-containing fluid and the fresh air remains in such a position that only fresh air is supplied via the outlet duct 18 to the heat input means 19, especially when the latter is a combustion chamber. It will be appreciated that the invention is not limited to pressure-exchangers designed to provide a hot-gas supply at high-pressure. In known manner, the cell walls may be formed with curved blades at one or both ends so that power developed is taken from the shaft. In that case, the heat input duct would be closed and there would be no outlet duct 20. The water injection may be continuous or may be used for temporarily boosting of the power of conventional pressure-exchangers.

In the arrangements outlined above the pressure rise is in fact limited by the energy which can be released from the gas contents of one cell. The arrangement of FIGURE 2 removes this limit by filling the cells with a heat-storing matrix. The matrix has a coarse mesh and hot-gases, say from a furnace, pass via a duct 25 into and through a matrix-containing rotor 26. Ducts 25 and 27 constitute together a heat input scavenging stage. Normally this stage will be at low or atmospheric pressure. After a cell has passed this stage, water or other vaporific liquid is injected through an injector 28 and it at least partially vaporizes by taking heat from the matrix. The pressure rises considerably, depending only on the heat capacity of the matrix and the amount of water injected. As the cell continues on its way steam together with some of the gas trapped at the low-pressure scavenging stage is tapped from the rotor, via the duct 29 and taken to be used externally of the pressure-exchanger, say in a turbine. The function of the transfer passage 30 is not primarily to increase the pressure rise available but to reduce the quantity of the high-pressure steam which would otherwise be wasted at the low-pressure scavenging stage. If the apparatus in which the high-pressure fluid is used incorporates a condensing plant, it is undesirable that gas which has entered at the low-pressure scavenging stage should be allowed to pass to the apparatus. This can be avoided by scavenging the cells with steam and one way of doing this is indicated in FIGURE 3. The cell approaching the position 31 is filled with steam and some of this is tapped off through a by-passing duct 32 and caused to re-enter the cells immediately after they have passed the low-pressure inlet duct 25. With appropriate adjustment of the port widths in relation to the speed of operation, this additional steam scavenging can ensure that substantially no gas is trapped. Desirable demarcation lines or inter-faces between the steam and gas contents of the cells are shown chain-dotted.

The matrix may be made of tubes or honey-comb material and it may be of different heat carrying capacity at the opposite ends of the cell. In the limit the matrix may merely consist of the cell walls arranged so that the length/width ratio of the cells is large.

Figure 2:
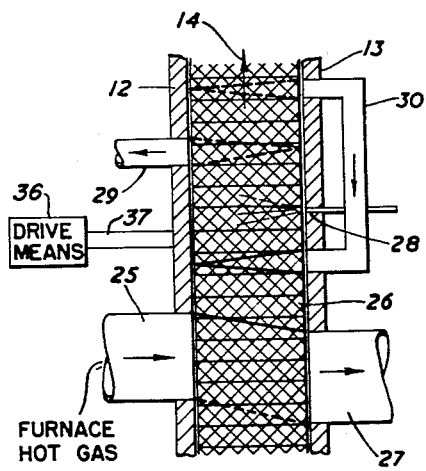
FIGURE 2 shows another pressure exchanger peripheral development, the cells in this instance accommodating a heat-storing matrix.
Figure 3:
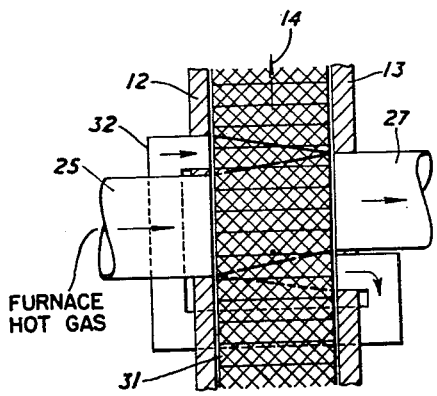
FIGURE 3 shows an alternative arrangement to the scavenging arrangement indicated in FIGURE 2.

It will be noted that wave processes have been indicated by full lines (compression waves) and by broken lines (expansion waves) on the figures and these can be used in known manner even in FIGURES 2 and 3 construction, though their effect will be necessarily damped by the friction set up by the matrices.

What I claim is:

1. Vapor generator apparatus comprising a series of cells arranged in a ring and having open ends, means defining a heat-storing matrix in the cells, means defining common stationary end walls for the cells and a series of ducts communicating with the cells at circumferentially spaced ports in the end walls, means for rotating the ring of cells, said series of ducts including in respective succession in one direction of rotation, a duct for contacting hot fluid with the matrix in the cells and a duct for removing high pressure fluid from the cells, and injection means communicating with the cells at an opening circumferentially spaced in one of the end walls intermediate respectively in said one direction of rotation the ports at which said first and second-named ducts communicate with the cells, to introduce vaporific liquid to the cells for vapor production in said high pressure fluid.

2. Vapor generator apparatus according to claim 1 wherein said series of ducts also includes a duct communicating with the cells at a port circumferentially spaced in one of the end walls intermediate respectively in said one direction of rotation the ports at which said second and first-named ducts communicate with the cells, to remove low pressure fluid from the cells.

3. Vapor generator apparatus according to claim 1 wherein said series of ducts also includes a duct communicating with the cells at a port circumferentially spaced in one of the end walls intermediate respectively in said one direction of rotation the port at which said first-named duct communicates with the cells and said opening at which said injection means communicates with the cells, to remove low pressure fluid from the cells.

4. Vapor generator apparatus according to claim 1 wherein said series of ducts also includes a first transfer duct communicating with the cells at a port circumferentially spaced in one of the end walls intermediate respectively in said one direction of rotation the port at which said first-named duct communicates with the cells and said opening at which said injection means communicates with the cells, and a second transfer duct communicating with the cells at a port circumferentially spaced in one of the end walls intermediate respectively in said one direction of rotation the ports at which said second and first-named ducts communicate with the cells, and further comprising duct means forming a closed circuit between said first and second transfer ducts.

References Cited in the file of this patent

UNITED STATES PATENTS

| | | |
|---|---|---|
| 1,531,475 | Brandt | Mar. 31, 1925 |
| 2,399,394 | Seippel | Apr. 30, 1946 |
| 2,780,405 | Jendrassik | Feb. 5, 1957 |
| 2,848,871 | Jendrassik | Aug. 26, 1958 |

FOREIGN PATENTS

| | | |
|---|---|---|
| 1,088,673 | France | Sept. 15, 1954 |
| 928,857 | Germany | June 13, 1955 |